(12) United States Patent
Andrews

(10) Patent No.: US 6,388,231 B1
(45) Date of Patent: May 14, 2002

(54) SYSTEMS AND METHODS FOR CONTROLLING DEPTHS OF A LASER CUT

(75) Inventor: John R. Andrews, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 33 days.

(21) Appl. No.: 09/594,089

(22) Filed: Jun. 15, 2000

(51) Int. Cl.⁷ .............................................. B23K 26/38
(52) U.S. Cl. ........................... 219/121.69; 219/121.68; 219/121.61
(58) Field of Search ....................... 347/47; 219/121.68, 219/121.69, 121.72, 121.61

(56) References Cited

U.S. PATENT DOCUMENTS

| | | | |
|---|---|---|---|
| 4,095,237 A | 6/1978 | Amberntsson et al. | |
| 4,419,678 A | 12/1983 | Kasugayama et al. | |
| 4,463,359 A | 7/1984 | Ayata et al. | |
| 4,771,295 A | 9/1988 | Baker et al. | |
| 4,774,530 A | 9/1988 | Hawkins | |
| 4,791,438 A | 12/1988 | Hanson et al. | |
| 4,970,600 A | * 11/1990 | Garnier et al. | 219/121.68 |
| 5,010,231 A | * 4/1991 | Huizinga | 219/121.69 |
| 5,061,341 A | * 10/1991 | Kildal et al. | 219/121.69 |
| 5,091,284 A | 2/1992 | Bradfield | |
| 5,189,437 A | * 2/1993 | Michaelis | |
| 5,208,604 A | 5/1993 | Watanabe et al. | |
| 5,233,369 A | 8/1993 | Carlotta et al. | |
| 5,312,517 A | 5/1994 | Ouki | |
| 5,320,789 A | 6/1994 | Nishii et al. | |
| 5,408,738 A | * 4/1995 | Schantz et al. | |
| 5,415,939 A | 5/1995 | Yeung | |
| 5,442,384 A | 8/1995 | Schantz et al. | |
| 5,696,546 A | 12/1997 | Narang et al. | |
| 6,229,114 B1 | * 5/2001 | Andrews et al. | 219/121.72 |
| 6,268,585 B1 | * 7/2001 | Ichikawa et al. | 219/121.69 |
| 6,313,434 B1 | * 11/2001 | Patterson et al. | 219/121.69 |
| 6,346,687 B1 | * 2/2002 | Kinoshita et al. | 219/121.61 |

FOREIGN PATENT DOCUMENTS

JP     4-12834 A   * 1/1992
JP     7-314669 A   * 12/1995

OTHER PUBLICATIONS

Dale R. IMS et al. "Method of Operation of Ink Jet Printer" Xerox Disclosure Journal—vol. 16, No. 4 Jul./Aug. 1991, p. 203.

* cited by examiner

Primary Examiner—Geoffrey S. Evans
(74) Attorney, Agent, or Firm—Oliff & Berridge, PLC

(57) ABSTRACT

A process for precision patterning or cutting of a sheet stock, such as an adhesive tape, includes the step of irradiating a surface of a sheet stock with an irradiation source to pattern or cut a part in the sheet stock and adjusting at least one of a beam width and the power of the irradiation source to form a cut in the sheet stock to a controlled depth. The method is particularly useful for precision cutting adhesive members, such as adhesive fluid seals, for an inkjet print cartridge.

37 Claims, 10 Drawing Sheets

SYSTEMS AND METHODS FOR CONTROLLING DEPTHS OF A LASER CUT

BACKGROUND OF THE INVENTION

1. Field of Invention

This invention is generally related to controlling the depth of a laser cut by adjusting the beam size and/or the energy density or power of a laser.

2. Description of Related Art

Making a connection between two fluid containing or transporting components is widely practiced. In the new and emerging area of microfluidics, the fluid carrying components are small, in the range of 500 microns down to as small as 1 micron and possibly even smaller. For a general description of this class of devices, see for example, the conference proceedings "Microfluidic Devices and Systems," *Proceedings of the SPIE,* Vol. 3515 (1998).

Microfluidic devices pose challenges in fluid path connection both within the microscopic componentry and also for the connection between a microfluidic device and macroscopic fluid containers or transporters. Such microfluidic devices are important in a wide range of applications that include drug delivery, analytical chemistry, microchemical reactors and synthesis, genetic engineering, and marking technologies including a range of ink jet technologies including thermal ink jet printing.

In existing thermal ink jet printers, such as disclosed in U.S. Pat. No. 4,774,530, the print cartridge comprises one or more ink filled channels, each communicating with a relatively small ink supply chamber or manifold, at one end and having an opening at the opposite end, referred to as a nozzle. In each of the channels, a thermal energy generator, usually a resistor, is located at a predetermined distance from the nozzle. The resistors are individually addressed with a current pulse to momentarily vaporize the ink and form a bubble, which expels an ink droplet.

U.S. Pat. No. 5,736,998 describes an improved ink seal between a nozzle plate and the pen cartridge in an ink jet printhead. Though mention is made of optimized shape and the use of a dispensed bead of adhesive, no mention is made of a laser cut seal or a discreet fluid seal member.

Previously, a typical end-user product in this art was a cartridge in the form of a prepackaged, usually disposable, item comprising a sealed container holding a supply of ink, and a die module having a linear or matrix array of channels operatively attached to the sealed container. Presently, however, products are designed using a more permanent (or at least multi-use) print cartridge connected to a replaceable ink tank unit.

However, in many of the various print cartridge designs, an important feature of the print cartridge is the fluid seal which is generally located between the ink supply manifold and the ink drop ejecting die module. The fluid seal is important because it must ensure a tight seal between the ink manifold and the die module. If a tight seal is not maintained, then ink can leak out of the print cartridge through the connection area and/or air and other contaminants can be introduced into the print cartridge and ink supply. A second important function is to seal the ink manifold fluid path in areas adjacent to the die module.

One example of a fluid seal is disclosed in U.S. Pat. No. 5,696,546, which describes an ink cartridge for an ink jet printer having an ink supply in a housing in fluid communication with an ink supply manifold. The ink is contained in an absorbent material in the ink supply, which has a housing floor having a vent and an ink outlet into a manifold. The manifold is an elongated recess in the outer surface of the housing. There can be a single or multiple chambers connected to a single or multiple ink supplies, depending in part on whether the print cartridge is a monochrome or multicolor print cartridge. The one or more chambers in the manifold have a common flat surface. A fluid seal or film member is bonded to this flat surface by an adhesive not attacked or eroded by the ink. This bond between the fluid seal and manifold must prevent ink from leaking from the manifold or ink leaking between chambers within the manifold.

There is at least one via or opening that goes all the way through the fluid seal for each chamber in the manifold. These vias provide fluid communication between each manifold chamber and an inlet of the die module. The surface of the film member opposite the surface bonded to the manifold is coated with a thermosetting adhesive, which bonds to a die module surface containing the ink inlets. The die module ink inlet is of similar size and is aligned with the vias in the fluid seal. The adhesive makes a seal around the via in the fluid seal and the inlet to the die module to provide a fluid communication path between a chamber of the manifold and the inlet to the die module while preventing fluid from leaking out of the desired fluid path. The adhesive bonding the fluid seal to the housing floor is either a pressure sensitive adhesive or the same thermosetting adhesive that is used on the other side of the film member. In the 546 patent, the fluid seal is cut using a die cutting method.

Die cutting sheet stock containing one or more thick layers of adhesive can leave adhesive on the cutting tool and cause additional distortion, failure to meet dimensional tolerances or jamming of the die cutting tool. To reduce sticking or to delay its onset, lubricants are frequently used to coat the die-cutting tool. Though the lubricant can be effective in this job, the lubricant can also modify or contaminate the adhesive so that it does not perform as well as an uncontaminated adhesive.

The die cutting process also involves shearing action between two cutters. The shearing action can create plastic fibers and adhesive strings. A large plastic fibers can create a leak path if it is located between the adhesive and sealing surface. Smaller plastic fibers can be carried by ink into the die module and clog the fine jets in the die module or otherwise impede ink flow into or through the die module. The adhesive strings can create difficulties in handling the fluid seal in the assembly equipment for the print cartridge or migrate to the surface of the die module containing the ink exit nozzles and interfere with the operation of the printing.

In forming the fluid seal for inclusion in a manufacturing line for automated assembly of print cartridges, it is convenient to have the fluid seal remain on a carrier tape. This can be done by not cutting through one layer, such as the bottom layer, of a multi-layered sheet stock. To cut partially through the sheet stock requires good control of the cut depth. Since the adhesive layers can re-flow, it is important to separate the adhesive on opposite sides of the cut. The shearing action of die cutting can cut through the adhesive layers but, since it does not remove material, the parted adhesive has a tendency to reflow and stick back together. When this happens, the part may be difficult to remove on the manufacturing line or strings of adhesive can interfere with the assembly process.

The complications and shortcomings inherent in die cutting of fluid seals are significant design limitations on an ink jet print cartridge containing fluid seals. The complications in the creation of parts with die cutting leads to significant problems with part yield and with loss of fully assembled print cartridges. Design limitations, process limitations, and both part and print cartridge yield all lead to a significant cost associated with the die cutting process.

Laser cutting and ablation methods are generally known, and have been applied in various methods within the ink jet art, as well as in other arts. U. S. Pat. No. 4,049,945 describes a method for cutting different shapes in a moving web by using both the motion of the web and the linear scanning of the laser to be able to cut individual features rather than using step and repeat and encompasses only scanned spot cutting. U.S. Pat. No. 4,639,572 describes cutting composite materials, such as circuit boards, that contain a filler and a polymer matrix and is not directed to multilayer sheet stock. U.S. Pat. No. 5,630,308 describes a method for scoring packaging material using a laser such that the scored line is weakened enough to enable controlled tearing of the material. A process for cutting through several members while leaving one member intact is not described. U.S. Pat. No. 4,549,063 describes using a laser to make discontinuous cuts to provide perforations in an adhesive laminate. The perforations permit tearing labels off a laminate backing.

Laser cutting methods are also known in the art for forming large parts. For example, laser patterning and cutting methods have been used in many areas, such as sheet metal fabrication, cloth cutting, and paper cutting.

Laser ablation has been used in the ink jet art to form specific features in ink jet die modules, such as ink passageways, orifices, and the like. U.S. Pat. No. 5,208,604 describes an ink jet head, where the ink discharge opening is formed by laser ablation, i.e., by irradiating an excimer laser onto the discharge opening plate. Similarly, U.S. Pat. Nos. 5,312,517 and 5,442,384 disclose forming specific features in an ink jet head using laser ablation methods. However, in each of these patents, none of the cuts form a sealed fluid path between two segments of the print cartridge, and the bulk part itself is cut using traditional cutting methods, while the laser is used only for forming features such as holes, lines, and the like.

Using of a laser to cut material involves control of a number of process parameters, including, for example, the material thickness, the laser beam width or diameter, the laser beam power, the laser beam energy density, the scanning speed or dwell time for a CW (continuous wave) laser, and/or the number of pulses for a pulsed beam. Cutting all of the way through the material using a laser allows for a relatively large latitude in the process parameters. The relatively large latitude is possible as the interaction of the laser beam with the material ends once the through cut is completed.

It is more difficult, however, to form a cut to a controlled depth, or a "kiss" cut. The difficulty arises from the fact that the laser beam is in contact with the material for the duration of the cutting process. Cuts to a controlled depth are frequently formed in a linear region of the process parameters. In other words, the cut depth is proportional to the process parameters. For example, the cut depth is proportional to the dwell time or scanning speed when cutting with a CW laser. As another example, the cut depth is proportional to the number of pulses when cutting with a pulsed laser beam.

Linear process parameters are convenient when the thickness of the material to be cut is changed or when changing the dwell time of the laser beam, for example, by adjusting the scanned cutting speed. Working in the linear range of the process parameters also allows for high cutting rates and rapid processing. The linear range of the process parameters can also be used for controlled depth cuts when the parameters are tightly controlled and non-varying and/or when the thickness of the material to be cut is very well controlled.

It may not be possible to control the process parameters and/or the thickness of the material to be cut to achieve a controlled depth cut to a satisfactory level of accuracy. If control of the process parameters and/or material to be cut is possible, it may be very expensive, however, to control the process parameters and/or the thickness of the material to be cut to achieve a controlled depth cut to a satisfactory level of accuracy. For example, if the laser power varies by 2% and the material thickness varies by 2%, in order to form a controlled depth cut to within three standard deviations, or for example, 3% of the thickness of the material, a closed loop control is necessary to control the laser if the cutting is being done in the linear range of the process parameters. In some cases, closed-loop control alone is insufficient to insure the repeatability of the desired cut depth. In this case, the nonlinear behavior of this invention facilitates controlled-depth cuts with high reliability.

SUMMARY OF THE INVENTION

This invention provides systems and methods for controlling the depth of cuts by a laser. As generally practiced in the art, fluid seals and other parts are cut from multilayer sheet stock using a die cutting process. For an application such as the creation of fluid seals, the shortcomings of die cutting include large design rules, both distortion of the adhesive or other layers near cut edges and long range distortion, the use of lubricants, generation of debris, and difficulty in making controlled-depth cuts.

In various exemplary embodiments of the system and method according to the invention, cuts of controlled depth are formed by a laser beam into a continuous web of sheet stock that includes a plurality of layers. The systems and methods according to the invention enable the creation of parts that remain on the continuous web by cutting the sheet stock to a controlled depth. The controlled depth cutting permits creation of a shape or part in several layers of the sheet stock and makes it possible to not cut through at least one of the layers of the sheet stock that forms the continuous web. The depth of the cutting is controlled by adjusting at least one of the laser beam width and the laser power. The laser beam width and/or the laser power is adjusted so that a high linear cutting rate is initially established and a lower, non-linear cutting rate is developed later in the cutting process at a depth that is near the desired final cut depth.

The non-linear cutting rate is achieved by varying the cutting beam width or diameter and/or the laser beam power or energy density. Adjusting the cutting beam width or diameter and/or the laser beam power or energy density so that the cutting rate is non-linear allows for rapid processing of cuts to a controlled depth and a large latitude in the laser beam width or diameter and/or the laser beam power or energy density.

BRIEF DESCRIPTION OF THE DRAWINGS

Various exemplary embodiments of this invention will be described in detail with reference to the following figures, wherein like numerals reference like elements, and wherein.

DETAILED DESCRIPTION OF EXEMPLARY EMBODIMENTS

Figure 1:
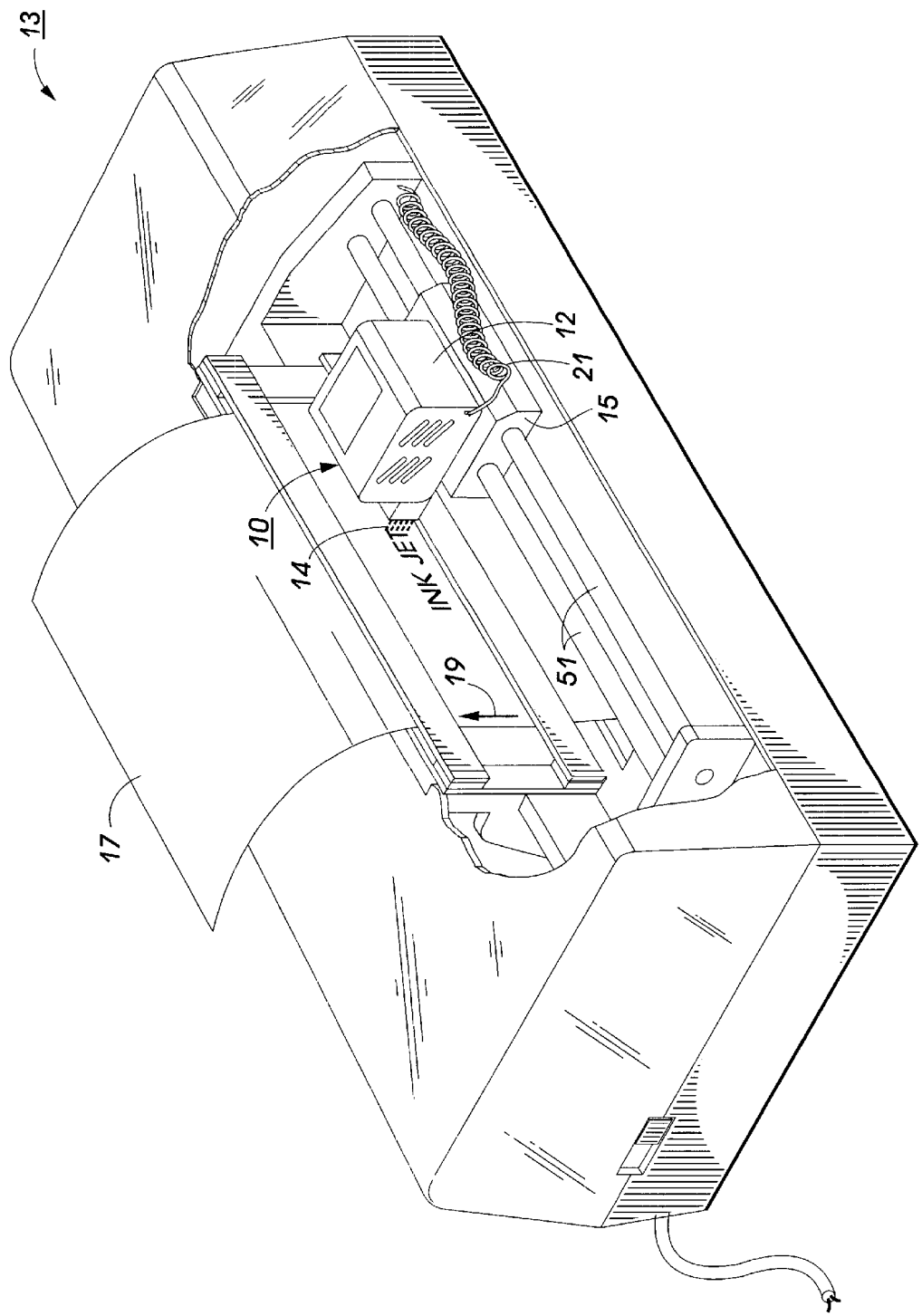
FIG. 1 is an isometric view of an exemplary embodiment of a thermal ink jet printer using an ink supply cartridge having a fluid seal prepared according to the invention.

FIG. 1 is a schematic isometric view of a type of thermal ink jet printer 13 in which the print cartridge 14 and the ink supply for the print cartridge 14 are combined in a single package, referred to hereinafter as a cartridge 10. The main portion of the cartridge 10 is the ink supply contained in a housing 12, with another portion forming the actual print cartridge 14. In this embodiment, the cartridge 10 is installed in a thermal ink jet printer 13 on a carriage 15. The carriage 15 is translated back and forth across a recording medium 17, such as, for example, a sheet of paper, on one or more guide rails 51. During translation of the cartridge 10 by the carriage 15, the cartridge 10 moves relative to the sheet 17 and prints characters or images on the sheet 17. Each translation of the cartridge 10 along the sheet 17 enables the print cartridge 14 to print with a swath defined by the height of the array of nozzles in the print cartridge 14 and the width of the sheet 17. After each swath is printed, the sheet 17 is advanced in the direction of the arrow 19, so that any number of passes of the print cartridge 14 may be employed to generate text or images onto the sheet 17. The cartridge 10 also includes a cable 21 by which digital image data may be supplied to the various heating elements (not shown) of the print cartridge 14 to print out the desired image. The cable 21 may include, for example, a plug that is incorporated in the cartridge 10 and that accepts a bus or cable from a data-processing portion of the thermal ink jet printer 13 and permit an operative connection from the thermal ink jet printer 13 to the heating elements in the print cartridge 14.

Figure 2:
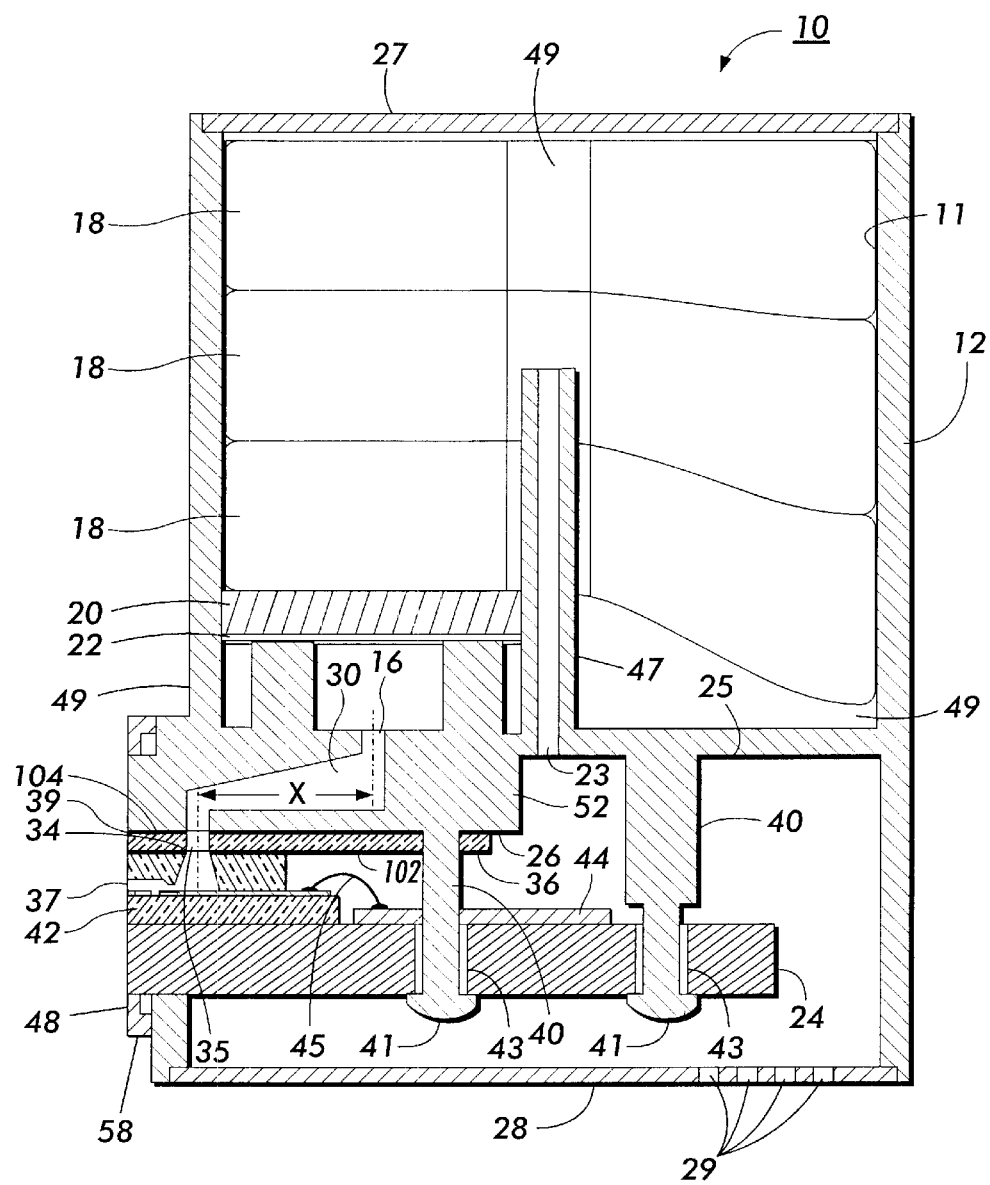
FIG. 2 is a schematic, cross-sectional elevation view of the cartridge in FIG. 1.

FIG. 2 is a schematic sectional elevation view of the cartridge 10. As described above, in various exemplary embodiments, the cartridge 10 is a combination print cartridge unit and ink tank unit. Although the cartridge 10 is shown as a combination of a print cartridge unit 14 and an ink tank unit 12, it should be appreciated that the print cartridge 14 and ink tank or ink tanks 12 may be separate units. The print cartridge 14 and ink tank 12 may be separable parts when the print cartridge 14 lasts longer than the supply of ink in the ink tank 12. If the print cartridge 14 lasts longer than the supply of ink in the ink tank 12, the ink tank 12 may be separately replaceable. Although the cartridge 10 is shown including a single ink tank containing a single ink color or type, it should be appreciated that the cartridge 10 may have multiple ink tanks, as the fluid seals provided by the laser cutting systems and methods of this invention provides for more precisely cut parts.

The cartridge 10 has a main portion in the form of the housing 12. The housing 12 may be made of a lightweight but durable plastic. The housing 12 defines an internal chamber 11 for storing of liquid ink, and has a floor 25 with a ventilation port or vent 23, open to the atmosphere, and an ink supply outlet 16. The ink supply manifold 30 is an elongated recess or trench formed in the thicker portion 52 of the manifold floor 25. The manifold 30 may be integrally molded in the chamber surface concurrently with the fabrication of the housing 12. One end of the manifold 30 is connected to the ink supply outlet 16, while the other end terminates at a location that will align with the inlet 34 of the die module 49. The distance from the center of the outlet 16 to the center of the die module inlet 34 is about 10 mm. A fluid seal 36 having a predetermined shape and an ink via 35 formed through the fluid seal 36 is bonded to an outer or bottom surface 26 of the manifold 30, covering and sealing the elongated recess within the manifold 30 and preventing ink from leaking out of the manifold 30. The ink via 35 through the fluid seal 36 is comparable in size to the die module inlet 34 and is aligned with the die module inlet 34 to form a fluid communication path between the manifold 30 and the die module inlet 34.

Figure 3:
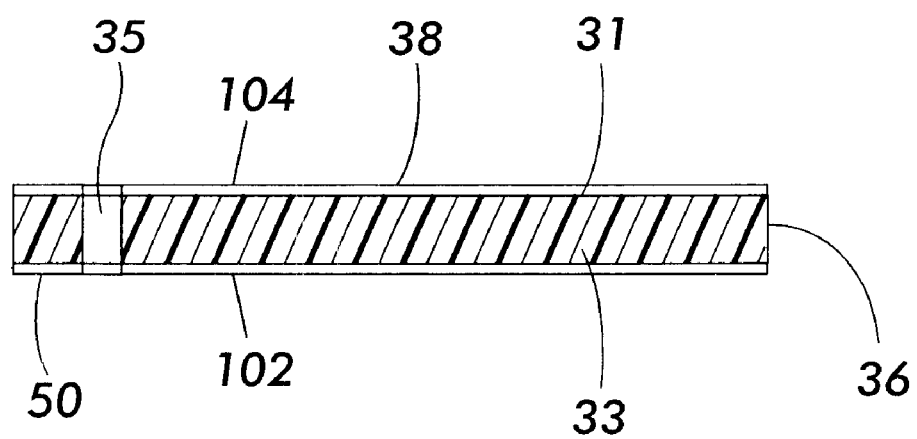
FIG. 3 is a cross-sectional view of an exemplary embodiment of a fluid seal.

As shown in FIG. 3, the fluid seal 36 has opposing surfaces 31 and 33, with the surface 31 of the fluid seal 36 coated with an adhesive layer 104 The other fluid seal surface 33 is also coated with an adhesive layer 102. The adhesive layers 102 and 104 can be formed of the the same adhesive material or can be formed of different adhesive materials. The adhesive material or materials may be both pressure sensitive and thermosetting.

The fluid seal 36 thus generally comprises a substrate of polymeric material coated on both sides by an adhesive layer. Suitable polymeric materials include, but are not limited to, polyesters, polyimides, polyetheretherketones, polyamides, polysulfones, polyethersulfones, polyetherimides, mixtures of these polymeric materials, and the like. Other materials can be used as will be appreciated by those skilled in the art.

As described above, the substrate of polymeric material is coated on both sides with an adhesive material. Suitable adhesives include, but are not limited to, any of the adhesives that can be processed and include those of the thermoset, thermoplastic, and pressure sensitive varieties. For example, suitable adhesives include, but are not limited to, epoxies, phenolic nitrile resins, acrylics, silicones, hot-melt thermoplastics, pressure sensitive adhesives, rubber thermosets, mixtures of these adhesive materials, and the like. As also described above, the adhesives used for the opposing surfaces of the film member can be the same adhesive or can be different adhesives.

The fluid seal 36 is bonded to the bottom or outer surface 26 of the manifold 30 with the pressure sensitive adhesive layer 104 on the surface 31 of the fluid seal 36. The fluid seal 36 is shaped to fit the bottom or outer surface 26 of the manifold 30, which may be irregularly shaped, and to avoid the locating and fastening pins 40 integrally formed or molded with the housing 12. The locating and fastening pins 40 are used to fixedly attach the print cartridge 14 and a heat sink 24. The elongated recess of the manifold 30 is hermetically sealed by the fluid seal 36 to form a closed ink passageway from the cartridge chamber 11 to the print cartridge nozzles 37.

Figure 4:
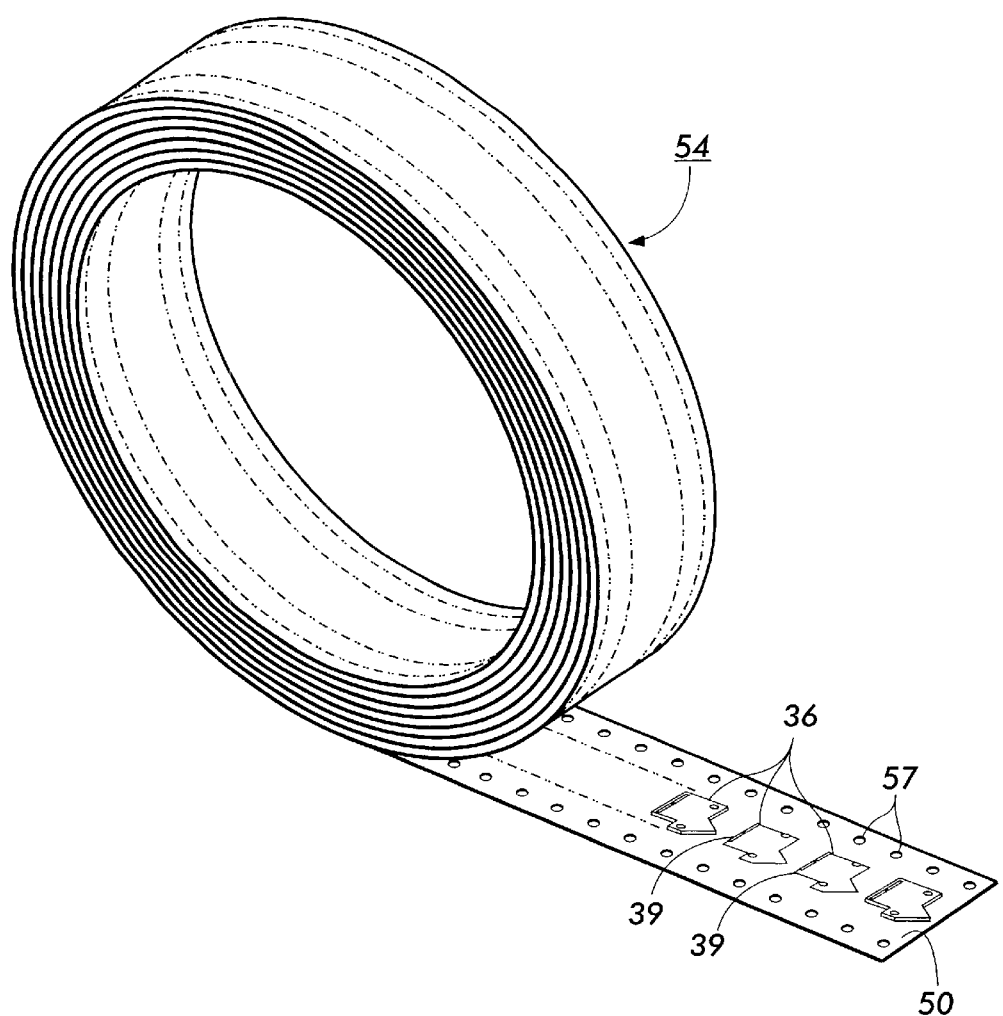
FIG. 4 is a schematic, isometric view of a roll of sheet stock that has been laser cut to contain a plurality of shaped fluid seals as shown in FIG. 3 held onto a carrier by the tackiness of the adhesive on the surface of the fluid seal in contact with the carrier.

The sheet stock 100 from which the fluid seal 36 is made may be prepared as a roll 54, as shown in FIG. 4. In this manner, the fluid seals 36, along with the sprocket holes 57, are cut into the sheet stock 100. It should also be appreciated that the sheet stock 100 may be transported by any other suitable transport.

Figure 5:
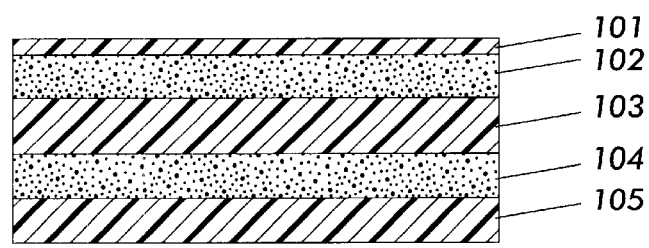
FIG. 5 is a sectional view of an exemplary embodiment of a fluid seal sheet stock.

As shown in FIG. 5, the sheet stock 100 includes a substrate 103. The substrate 103 may be formed of a polymeric material, such as Mylar®. The substrate 103 is coated on either side by the adhesive layers 102 and 104. The adhesive layers 102 and 104 can be formed of, for example, epoxy, such as phenolic nitrile. A release liner 101 is applied to the adhesive layer 102. The release liner 101 can be formed of a polymeric material, such as Mylar®. A carrier strip 105 is applied to the adhesive layer 104. The carrier strip 105 can also be formed of a polymeric material, such as Mylar®. The substrate 103 and the adhesive layers 102 and 104 form a double sided adhesive tape.

The substrate 103 of the sheet stock 100 may have a thickness of about 7 mils (~180 $\mu$m). The adhesive layers 102 and 104 may each have a thickness of about 2 mils (~50 $\mu$m). The thickness of the release liner 101 may be about 1.5 mils (~40 $\mu$m) and the carrier strip 105 may have a thickness of about 3 mils (~75 $\mu$m). The thickness of the sheet stock may be about 15.5 mils, or about 390 $\mu$m.

Figure 6:
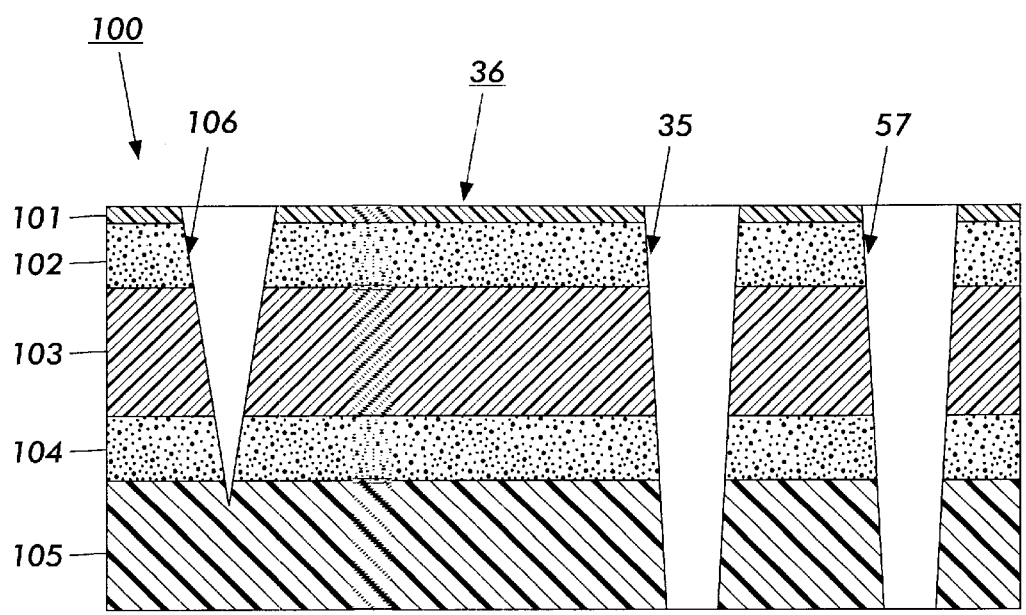
FIG. 6 is a sectional view of the fluid seal sheet stock of FIG. 5 including a kiss cut formed by a laser cutting method according to the invention.

The ink via 35 and the front edge 39, which is coplanar with the print cartridge nozzle face 42, and the remaining profile or periphery of the fluid seal 36, are then cut using a precision laser cutting operation described below. As shown in FIG. 6, the ink via 35 and the sprocket holes 57 are formed in the sheet stock 100 by cutting through the entire thickness of the sheet stock 100 using a laser. The profile or periphery of the fluid seal 36, including the front edge 39, is formed by a cut to a controlled depth, i.e., a kiss cut 106, using a laser. The kiss cut 106 is formed entirely through the release liner 101, the adhesive layer 102, the substrate 103, and the adhesive layer 104. The depth of the kiss cut 106 can be adjusted to score to a depth of only about 1 mil (~25 $\mu$m) into the 3 mil (~75 $\mu$m) carrier strip 105. The fluid seals 36 are thus carried by the carrier strip 105.

After forming the fluid seals 36 in the sheet stock 100, the fluid seals 36 carried by the carrier strip 105 are fed into a pick and place zone of a robotic device (not shown) and the fluid seals 36 are vacuum picked off the carrier strip 105. The fluid seal 36 picked off the carrier strip 105 is then positioned over the outer or bottom surface 26 of the manifold 30 using a vision system (not shown), and placed onto the outer or bottom surface 26 with a specified pressure and temperature by the robotic device. The release liner 101 is then removed with a higher tack tape or mechanical picker (not shown). The die module 49 and the heat sink 24 are aligned and placed onto the awaiting fluid seal 36. The fluid seal 36 is bonded to the die module 49 such that the die module inlet 34 is aligned to the ink via 35 in the fluid seal 36. A printed circuit board 44 is bonded to the heat sink 24 adjacent the die module 49. The terminals or contact pads (not shown) of the print cartridge 14 and the circuit board 44 are interconnected by wire bonds 45. Locating holes 43 in the heat sink 24 are used when mounting the heat sink 24 to the print cartridge 14 and the circuit board 44 bonded to the print cartridge 14 to align the die module inlet 34 and the nozzle face 42 relative to the housing 12 by inserting the locating and fastening pins 40 therein. The locating and fastening pins 40 are then ultrasonically staked to form pin heads 41. Optionally, the locating and fastening pins 40 may be bonded to locating holes 43 in addition to being staked.

The wire bonds 45 are encapsulated with a thermally curable passivation material (not shown) by, for example, an injection syringe, which fills the cavity behind the print cartridge 14 and covers the wire bonds 45. The housing 12, the attached heat sink 24, the print cartridge, and the circuit board 44 are cured in an oven, thus simultaneously curing the adhesive 102 and the wire bond encapsulating passivation material. Alternatively, curing the adhesive 102 and curing the encapsulant can be conducted in several steps.

The cartridge 10 shown in FIG. 2 also generally includes a cosmetic bottom cover 28 having ventilation openings 29. This region of the cartridge 10 is covered by a rectangular shaped frame 48 having a lip 58 around the outer edge of the frame 48 and extending in a direction towards the housing 12. The ink holding medium 18 is shown as three separate portions, occupying most of the chamber 11. The chamber 11 is covered by a top housing cover 27. A tube 47 extends from the vent 23 to center of the interior of chamber 11 in the housing 12 and through openings in each of the ink holding mediums 18. A member 20 is also located within the housing 12 and is made of a material providing a high capillary pressure, for example, a scavenger. The member 20 serves as a porous capillary barrier between the ink holding mediums 18 and the ink supply outlet 16. The member 20 can also include a filter cloth 22 that is attached to felted melamine using a porous hot-melt laminating adhesive. Generally, one portion of the outer surface of the member 20 abuts an ink holding medium 18, while other portions of the surface of the member 20 are exposed to an open space between the medium 18 and the inner walls of the chamber 11.

Figure 7:
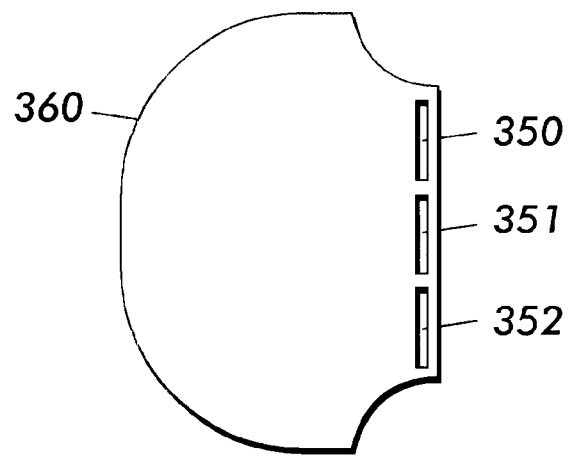
FIG. 7 is a plan view of an exemplary embodiment of a fluid seal.
Figure 8:
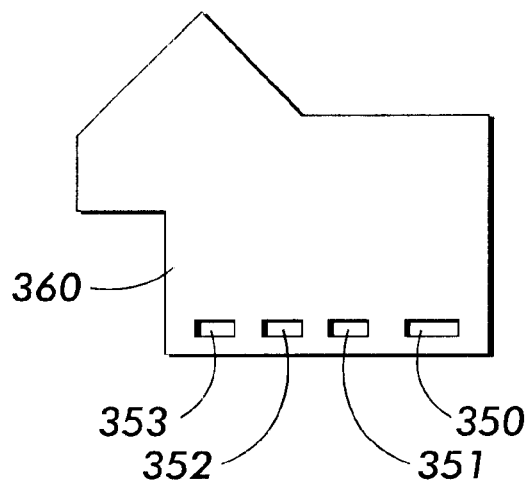
FIG. 8 is a plan view of another exemplary embodiment of a fluid seal.

The design of the fluid seal is not particularly limited. Rather, as also discussed above, the cutting process of the invention can be used to design and cut fluid seal members having higher numbers of independent ink channels. For example, alternative embodiments of the fluid seals of the invention are shown in FIGS. 7 and 8. FIG. 7 shows another exemplary embodiment of a fluid seal 360 including three ink vias 350, 351, and 352, which can be used as independent ink channel openings. FIG. 8 shows another exemplary embodiment of a fluid seal 360 including four ink vias 350, 351, 352, and 353, which provide four independent ink paths. Furthermore, it will be recognized by those skilled in the art that the shape of the fluid seal members 36 and 360 shown in FIGS. 4, 7, and 8 is determined by the print cartridge assembly, and is in no way limited to those shown in the figures. Other embodiments, including even more ink vias, are also encompassed within the scope of the invention.

The method of precision cutting the fluid seal 36 or 360 from the unprocessed sheet stock 100 will now be described in detail. In contrast to the prior art, which generally used mechanical die cutting processes to form the fluid seals, the laser cutting systems and methods of this invention use laser cutting processes. The laser cutting processes of the laser cutting systems and methods of this invention provide advantages over die cutting, in terms of allowing more precise cutting, decreased distortion arising from the cutting process, reduction in particulate debris with sizes >5 $\mu$m, and elimination of lubricants in the cutting process. Further, these laser cutting processes permit finer design rules for the fluid seal, providing the possibility of increasing the number of non-communicating ink passages within a given area or of shrinking the overall size of the bonding area to the silicon chip. Such modification in the cutting design rules can not be implemented in the traditional cutting processes.

In various exemplary embodiments of the laser cutting systems and methods according to this invention, any suitable laser, or more generally, irradiation source, can be used as the cutting tool. Suitable laser sources include, but are not limited to, solid state lasers such as Nd:YAG (neodymium:yttrium aluminum garnet) lasers and their harmonics at shorter wavelength, ultraviolet lasers such as excimer lasers, free electron lasers, gas discharge lasers, such as argon ion or krypton ion lasers or copper vapor lasers, infrared lasers such as RF (radio-frequency discharge) $CO_2$ lasers or TEA (transverse electric discharge-atmospheric pressure) $CO_2$ lasers, and the like. In various exemplary embodiments, the material to be cut will absorb radiation at the wavelength emitted by the laser. Therefore, ultraviolet lasers such as the excimer laser and $3^{rd}$ harmonic emitting Nd:YAG lasers can be more useful compared to the fundamental wavelength emitting Nd:YAG lasers emitting in the visible light area of the spectrum. Also, the 9.4 $\mu$m wavelength $CO_2$ laser can be more useful compared to the 10.6 $\mu$m $CO_2$ laser, because of the higher absorption of most polymers at 9.4 $\mu$m.

Specific selection of a laser source will depend on the composition and physical properties of the material being processed, the thickness of each of the several layers in the sheet stock 100, the overall thickness of the sheet stock 100, the required spatial resolution, the desired surface quality, and economic considerations such as power consumption, equipment cost, maintenance cost, and processing speed. For example, an RF $CO_2$ laser may be more useful in some embodiments, because it offers lower equipment and operating costs and it delivers higher levels of power to the material, enabling rapid processing. However, the design rules for the RF $CO_2$ laser are limited by the presence of a heat-affected zone 10 $\mu$m–50 $\mu$m width at the cut edges and by a relatively large focused spot diameter, typically>50 $\mu$m. In other exemplary embodiments, an excimer laser may be more useful because it offers a much finer resolution, approximately 2 $\mu$m–5 $\mu$m and a heat-affected zone<5 $\mu$m, although at higher costs. In still other exemplary embodiments, a TEA $CO_2$ laser may be more useful as a compromise between cost, feature size and edge quality.

In various exemplary embodiments of the laser cutting systems and methods of this invention, multiple lasers, which can be the same type or of different types, can be used to perform the cutting process. In one such exemplary embodiment, multiple excimer lasers can be used to provide sufficient power for rapid cycle times. In a second exemplary embodiment, two different lasers could be used. For example, an excimer laser could be used to do the precision cut in the region of the front edge 39 of the fluid seal 36 and ink vias 35. Then, an RF $CO_2$ laser can be used to cut the part in regions away from the front edge 39 that bonds to the die and also to cut the sprocket holes 57 used to transport the sheet stock 100 in the print cartridge manufacturing robotic system.

Figure 9:
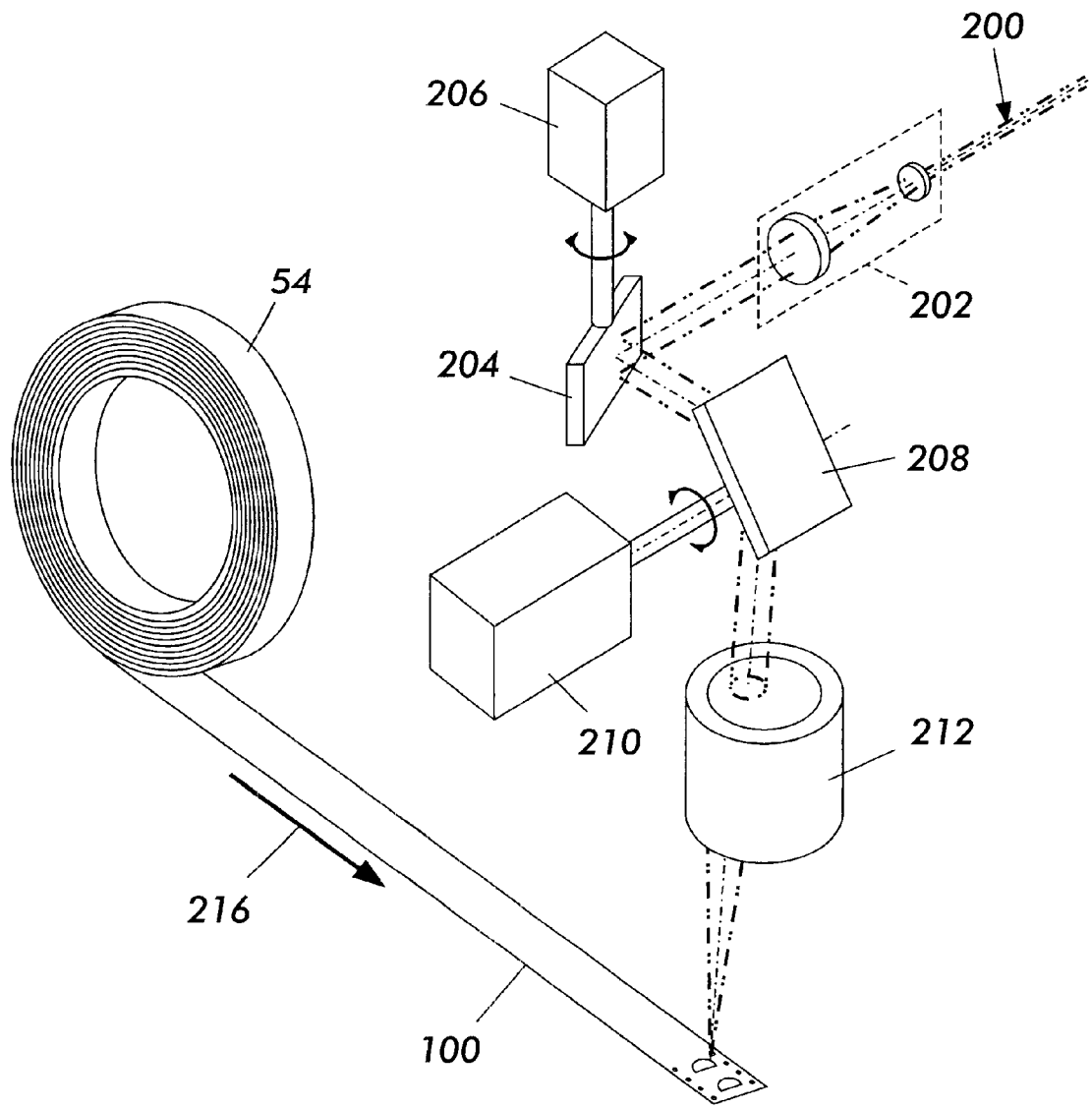
FIG. 9 is a perspective view of a flying spot scanning cutting apparatus.

In various exemplary embodiments of the invention, the cutting of the fluid seal 36 or 360, or other members, from the sheet stock 100 can be conducted in several different ways. The choice of method depends on the specific characteristics of the laser and the material processing parameters required. For example, flying spot scanning is most appropriate for CW or high frequency pulsed lasers such as the RF $CO_2$ and Nd:YAG lasers. In this method, shown generally in FIG. 9, the laser beam 200 originating from a laser source (not shown) passes through a Galilean beam expander 202. The expanded laser beam 200 reflects from a first deflecting mirror 204 that is operatively connected to an x-axis scanner 206, and a second deflecting mirror 208 that is operatively connected to a y-axis scanner 210. The reflected laser beam 200 is then focused to a tight spot by a f$\theta$ flat field scanning lens 212.

The focused laser beam spot 200 is scanned by the mirrors 204 and 208 onto the sheet stock 100, which moves in the direction of arrow 216 from the roll 54 to a take-up roll (not shown). As a result, the laser beam 200 cuts the desired parts in the sheet stock 100. Thus, in a vector scanning method, the outline of the fluid seal 36 or 360 and the sprocket holes 57 are cut. By properly controlling the scanning speed and the laser power, the cut depth can be chosen. Thus, cuts through the release liner 101, the adhesive layer 102, the substrate 103, and the adhesive layer 104 can be made while only cutting a small distance into the carrier strip 105 to form the fluid seal 36 or 360. Cuts can be made through the entire sheet stock 100 to form the ink vias 35 and the sprocket holes 57. The sheet stock 100 can be stationary during the cutting process and then advanced for cutting the next fluid seal 36 or 360. Alternatively, the sheet stock 100 can be transported at a constant speed while the fluid seal 36 or 360 is being cut, having properly accounted for the motion of the sheet stock by adjusting the motion of the galvanometers 204 and 208. In a modification of the flying spot method, which is not shown but will be readily apparent to those skilled in the art, the laser beam is stationary and the sheet stock 100 is moved along two axes parallel to the plane of the sheet stock 100.

Figure 10:
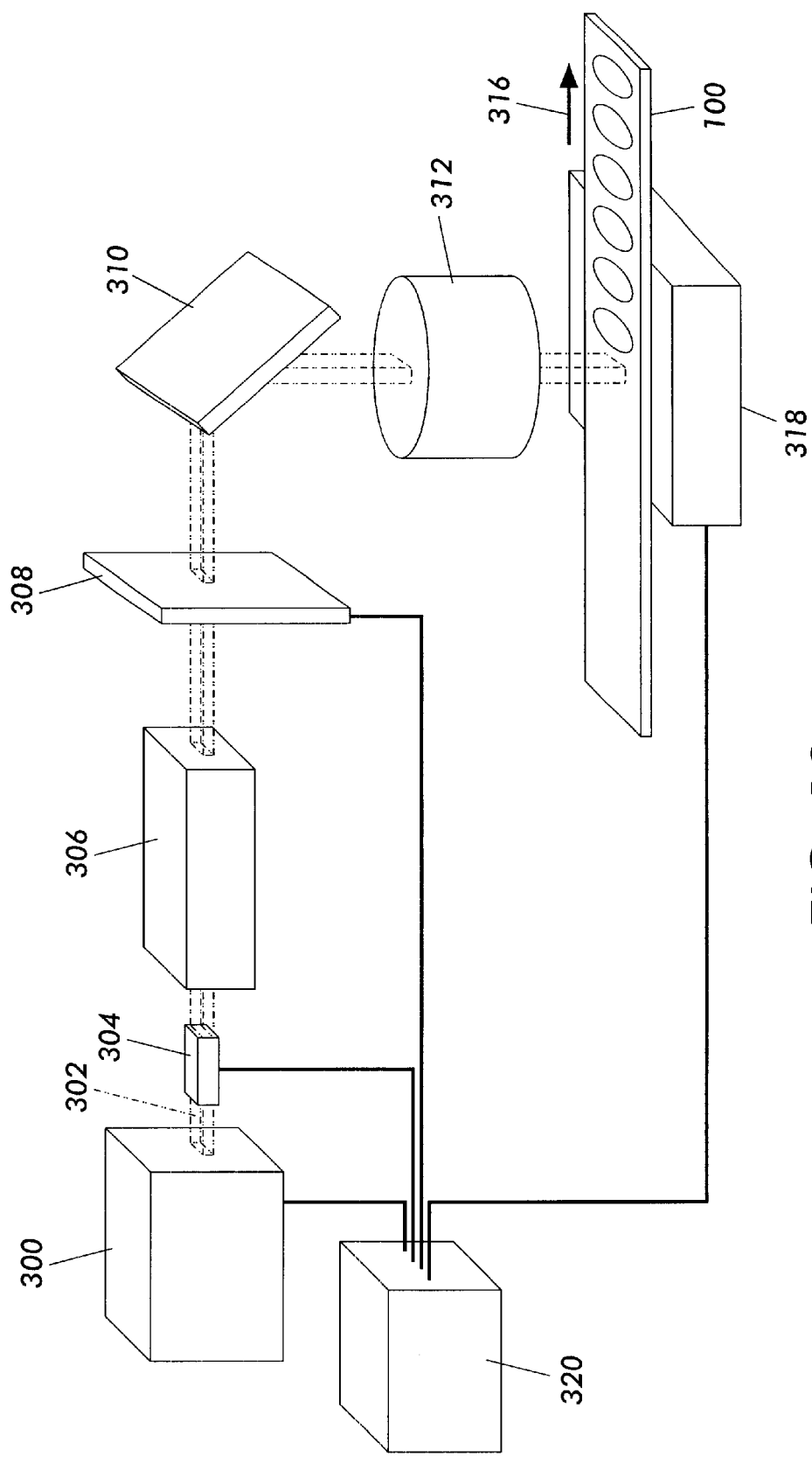
FIG. 10 is a perspective view of an imagewise ablation cutting method.

An alternative cutting method, useful in other various exemplary embodiments of the invention, is the imagewise ablation method, such as shown in FIG. 10. The imagewise ablation method is most appropriate for short pulse and relatively low frequency (<1 kHz) gas discharge lasers, such as excimer and TEA $CO_2$ lasers. In this cutting system, the laser source 300 emits a laser beam 302, which is processed through a variable attenuator 304 and beam shaping stage 306. The laser beam 302 is imaged onto a mask 308 containing the pattern of the cut (not shown). The patterned laser beam 303 is then deflected by deflecting mirror 310 and passes through an appropriate lens 312, after which the patterned laser beam 303 is imaged onto the sheet stock 100, which is supported on a cutting stage 318. The sheet stock 100 is transported in the direction of arrow 316 from a feed roll (not shown) to a take-up roll (not shown) and can be either advanced between cutting operations or transported continuously with accounting of the motion of the sheet stock 100 in the cutting process. Each of the laser source 300, the variable attenuator 304, the mask 308 and the cutting stage 318 are operably connected to a suitable controller 320. Further, the mask 308 is provided such that it can be moved in the x- and y-directions by one or more actuators (not shown). The laser beam 302 is used to illuminate the mask and forms a laser light image of the area to be cut on the sheet stock 100. An appropriate number of pulses from the laser source can remove, by an ablation process, the unwanted material. A modification of the imaging method may also scan some combination of the laser beam source 300, the mask 308, and the sheet stock 100. Each of these methods is encompassed by the invention, as well as known or later developed variants of each of these methods that will be apparent to one skilled in the art based on the disclosure.

Figure 11:
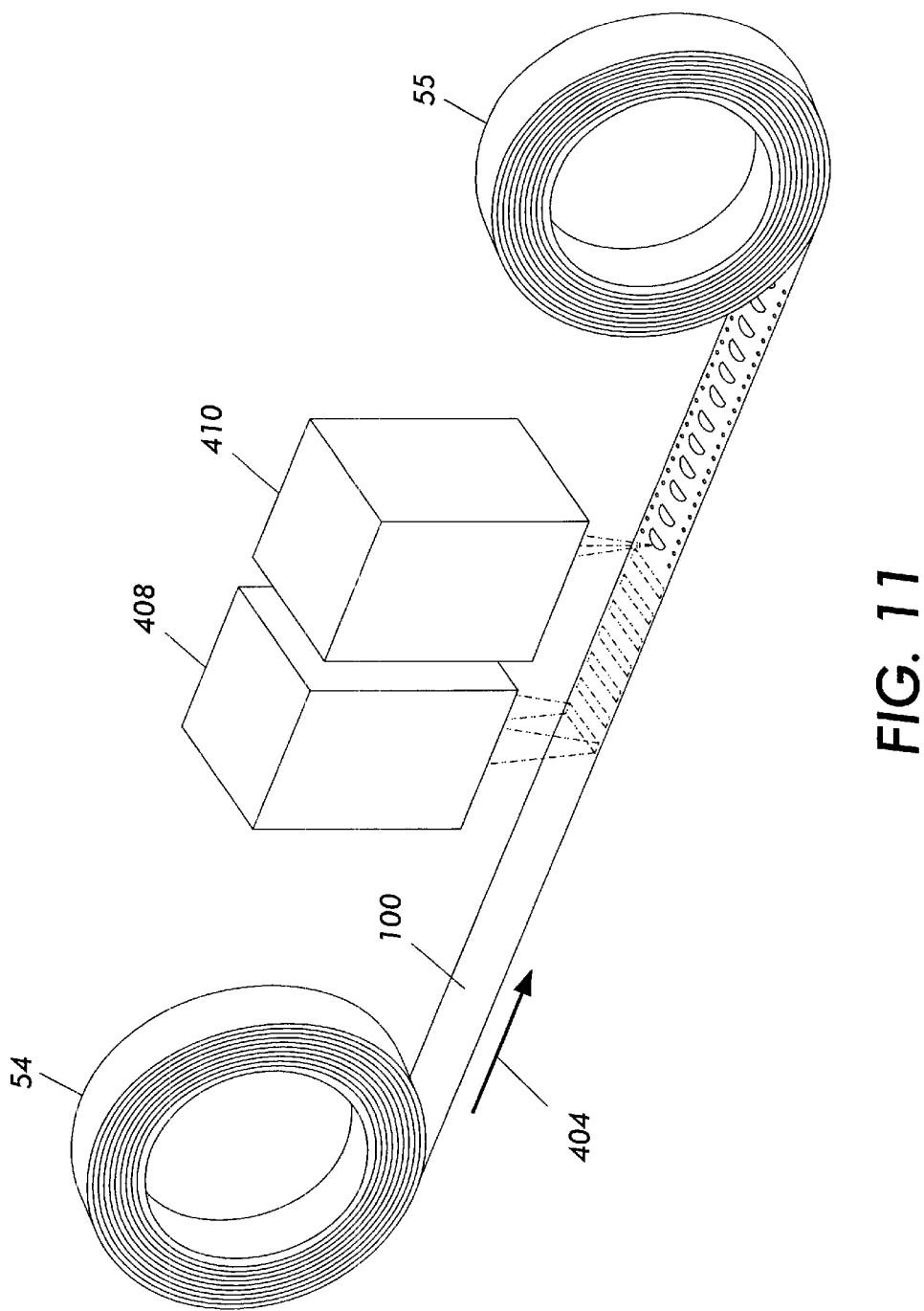
FIG. 11 is a perspective view of a hybrid cutting system.

Still further, as discussed above, a combination of laser sources can be used in a single cutting method, if desired. An example of such a hybrid cutting system is shown generally in FIG. 11. As shown in FIG. 11, the hybrid cutting system may, for example, combine both the flying spot scanning system shown in FIG. 9 and the imagewise ablation system shown in FIG. 10. In this hybrid system, the sheet stock 100 moves in the direction of arrow 404 from the roll 54 to a take-up roll 55. The sheet stock 100 is first imaged by an imagewise ablation cutting system 408 followed by a flying spot cutting system 410, or vice-versa, to form respective cuts in the sheet stock 100.

To perform the laser cutting process according to this invention, the energy characteristics of the laser source are usually adjusted to provide the desired penetration depth and cutting properties. For example, in an exemplary embodiment where a KrF excimer laser operating at 248 nm is used as the laser source, the laser can effectively and precisely cut a 350 $\mu$m thick tape at an energy density of 0.3 J/m$^2$ to 3 J/m$^2$. In the case of an RF/CO$_2$ laser source, a laser power of from about 10 W to about 500 W, preferably from about 25 W to about 300 W, and even more usefully from about 25 W to about 150 W, may be used with a spot diameter at the substrate between 50 $\mu$m and 250 $\mu$m and more usefully between 60 $\mu$m and 130 $\mu$m and scanning speeds between 0.05 m/s and 5 m/s and more usefully between 0.25 and 4 m/s. However, the light intensity will of course depend upon the specific laser source being used and the specific sheet stock being cut, and so values outside of these ranges may be used, as necessary.

Furthermore, it will be readily recognized that the laser processing parameters may be adjusted within broad ranges to account for the specific properties desired, the materials being used, the laser power, and cutting method. For example, the specific laser cutting process parameters, such as fluence, intensity, and cutting speed will depend upon such factors as wavelength and type of the laser, rate of irradiation, pulse width, energy level, and the like. Based on this disclosure one skilled in the art can select such processing parameters for a specific material to be cut.

The laser-cutting process according to this invention can be used for a wide range sheet stock composed of polymeric substrates and adhesives, such as mentioned above. The laser cutting according to this invention can operate well for a wide range of sheet stock thicknesses and for a range of multi-layer structures. In particular, polymer sheet stock as thin as 6 $\mu$m or less and as thick as 1000 $\mu$m or more, as well as thickness in between, can be readily cut. Furthermore, adhesive layers, either freestanding or as coatings on substrates, can be cut with thicknesses as thin as 1 $\mu$m or less and as thick as 1000 $\mu$m or more, as well as thicknesses in between. Multi-layer sheet stock, such as the raw material for the fluid seals discussed above, is typically in the thickness range of 200–500 $\mu$m, and is cut with no difficulty.

Because laser cutting effects the cutting operation in a much different manner than die cutting, the laser cutting process according to this invention provides significant process and product advantages over the prior art. In particular, the laser cutting process according to this invention allows significant decreases in the minimum feature sizes to obtain reliable bonding. Die cutting generally required large separation between a via and another cut edge to achieve reliable bonding to the die module and to the manifold due to the distortion effects of mechanical cutting. The laser cutting systems and methods according to this invention permit precision cutting, even of high aspect ratio features located close to one another, having small feature size, no mechanical distortion and minimal distortion at the cut edges due to heating effects from the cutting laser. In particular, the laser cutting systems and methods according to this invention permit cutting of individual vias spaced 250 $\mu$m or less, more usefully spaced 100 $\mu$m or less, and even more usefully spaced 50 $\mu$m or less from a second edge of either another via or another cut edge with no mechanical distortion and heat affected zones less than 25% of the distance between the features. In contrast, design rules for die cut parts generally require >500 $\mu$m separation between cut edges to have no more than 25% of the separation distance unperturbed by the mechanical action of the die cutting.

Laser cutting applications are frequently performed in the linear region of the process parameters. For example, the depth of a cut is a function of the dwell time for a CW laser or the number of pulses for a pulsed laser beam. The depth of the cut is also a function of the energy density, the beam diameter or width, or the laser power. The use of linear process parameters tends to work well for forming cuts of controlled depth when the parameters are tightly controlled and don't vary and when the thickness of the material to be cut is tightly controlled. It may not be possible to tightly control the linear process parameters for a particular laser or laser cutting system. If tight control of the linear process parameters is possible, it may be expensive to provide control. A closed loop control may add to the cost of the cutting system and may slow down the processing speed of the system.

In various exemplary embodiments of the laser cutting systems and methods according to this invention, at least one of the beam width and the laser energy density is adjusted to provide a linear cutting rate for the initial cutting and a non-linear cutting rate as the cut approaches the desired depth. Decreasing the cutting rate as the desired final cut depth is approached allows for wide latitude in the process parameters and eliminates the need for a closed loop control. The processing speed of the laser cutting system can thus be increased. For example, to cut the sheet stock 100 of FIG. 5 to a controlled depth, to within a tolerance of 3% of the entire thickness of the sheet stock 100, by adjusting the beam width and the energy density so that the cutting rate is non-linear, the power of the laser and the dwell time may vary by greater than 10% and no closed loop control is required.

In various exemplary embodiments of the laser cutting systems and methods according to this invention, the cut depth to cut width ratio is set to be greater than one. In other words, the beam width is smaller than the desired cut depth. In various exemplary embodiments of the laser cutting systems and methods according to the invention, the beam width is set to be between one half and one fifth of the desired cut depth. In other exemplary embodiments, the beam width is to be one third of the desired cut depth.

By adjusting the beam width and the laser power, it is possible adjust the depth at which non-linear cutting begins. At a constant laser power density, decreasing the beam width decreases the depth at which non-linear cutting begins. Determining the actual laser power densities and beam widths at which the transition from linear cutting to non-linear cutting begins is dependent on the type of laser and material being cut and can be experimentally determined.

While the precision laser cutting operation of the laser cutting systems and methods according to this invention has been described as being useful in the production of fluid seals for ink jet print cartridges that require precision patterning, the cutting processes of the laser cutting systems and methods according to this invention can also be used for a variety of precision cutting purposes in other areas. For example, the laser cutting processes of the laser cutting systems and methods according to this invention can be used in any of the various operations in which adhesive seals are produced, or where adhesive or non-adhesive tapes are cut to provide individual parts. In particular, individual parts can be cut from a multi-layer sheet stock where one of the layers of the sheet stock, typically the bottom layer, is not cut entirely through by the laser cutting process but remains at least partially intact. The intact layer then serves as a carrier strip to position parts for automatic handling in an assembly line. Thus the cutting processes of the laser cutting systems and methods according to this invention can be used to pattern precision cut parts for a wide variety of fields and applications where precision cutting of small parts or features is required and where handling of a large number of parts on a continuous tape is convenient or required.

The following example is illustrative of various exemplary embodiments of the laser cutting systems and methods according to this invention, but is not limiting of the laser cutting systems and methods according to this invention. It will be apparent that the invention can be practiced with many different laser cutting sources and types of sheet stock and can be used for a variety of different uses in accordance with the disclosure above and as pointed out below.

EXAMPLE

The sheet stock 100 of FIG. 5 includes the release liner 101, the substrate 103 and the carrier strip 105 formed of a polymeric material, such as MYLAR®. The sheet stock 100 also includes the adhesive layers 102 and 104 formed of, for example, phenolic nitrile. The sheet stock 100 may be considered a single thickness of MYLAR® for purposes of the example. The thickness of the sheet stock 100 is about 15.5 mils, or about 390 $\mu$m. A 150 W $CO_2$ laser operating at 9.4 $\mu$m is used to cut the fluid seal around the remaining peripheral region while leaving the carrier strip 105 intact and also to cut out the sprocket holes 57 for the transport. The kiss cut 106 is formed entirely through the release liner 101, the adhesive layer 102, the substrate 103, and the adhesive layer 104. The total depth of the kiss cut 106 through the adhesive layer 104 is about 12.5 mils, or about 320 $\mu$m. The kiss cut 106 extends about one third of the way into the carrier strip 105, which is about 1 mil or 25 $\mu$m. The total depth of the kiss cut is thus about 340 $\mu$m.

Figure 12:
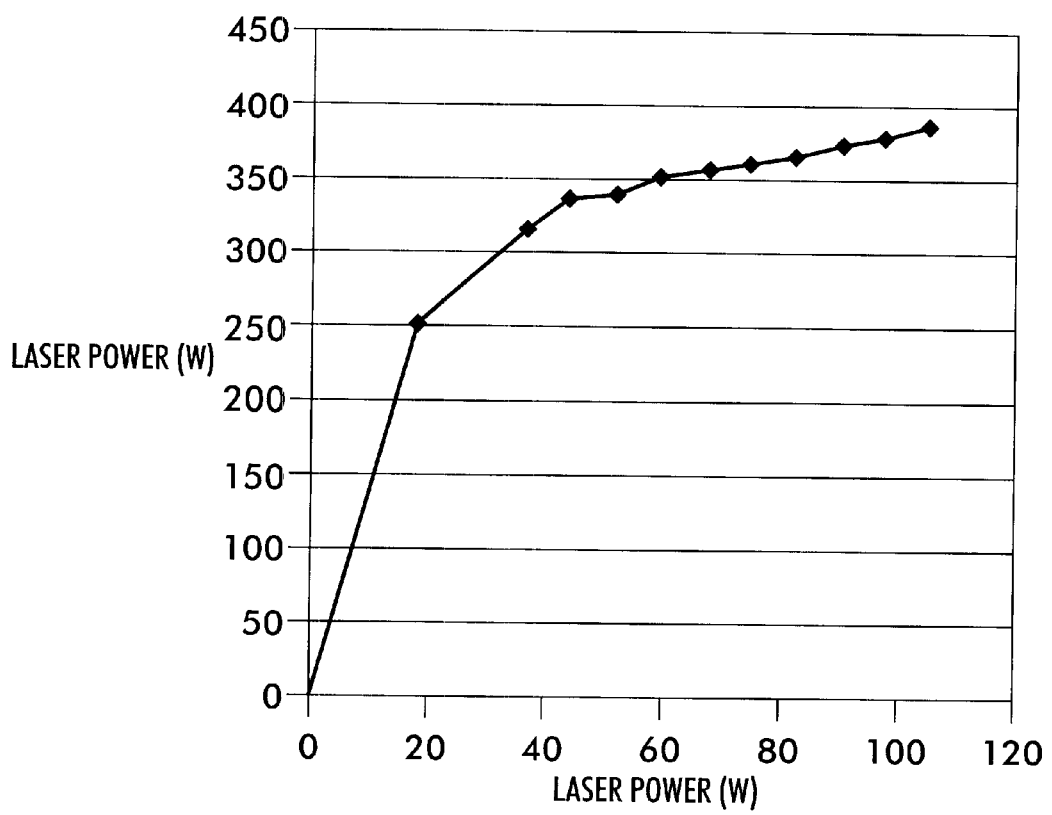
FIG. 12 is a graph of the relationship between the laser power and the depth of a cut according to an exemplary embodiment of a laser cutting method according to the invention.

The beam is focused to a 110 $\mu$m spot on the top surface of the release liner 101. The beam is scanned by a galvanometer at 0.43 m/s. The cutting rate of the laser is determined by varying the power of the laser. As shown in FIG. 12, the cutting rate becomes non-linear at approximately 40 W. To produce a kiss cut of about 340 $\mu$m, a laser power of 70±10 W will provide a cut of satisfactory depth.

As will be apparent to one of ordinary skill in the art, numerous changes, alterations and adjustments can be made to the above-described exemplary embodiments without departing from the scope of the invention, and the invention is in no way limited to the specific exemplary embodiments described above. One skilled in the art will recognize that the various aspects of the invention discussed above may be selected and adjusted as necessary to achieve specific results for a particular application. Thus, the foregoing exemplary embodiments are intended to illustrate and not limit the invention. It will be apparent that various modifications can be made without departing from the spirit and scope of the invention.

What is claimed is:

1. A process for precision patterning sheet stock, comprising:
   initially irradiating a surface of a sheet stock with a beam from an irradiation source to pattern a part in the sheet stock at a linear rate; and
   cutting at least one cut having a controlled depth in the sheet stock with the beam, wherein at least one of a beam width and a power of the irradiation source is adjusted so that a cutting rate is non-linear as th e controlled depth is approached.

2. The process of claim 1, wherein the sheet stock is a double-sided adhesive tape, the irradiation source is a RF $CO_2$ laser, and the patterning is conducted using a flying spot scanning method.

3. The process of claim 1, wherein the beam width is about one half to one tenth of the controlled depth.

4. The process of claim 1, wherein the beam width is about one third of the controlled depth.

5. The process of claim 1, wherein the sheet stock comprises:
   a substrate; and
   adhesive material on each side of the substrate.

6. The process of claim 5, wherein the substrate is formed of a polymer.

7. The process of claim 6 wherein the polymer is at least one of polyester, polyimide, polyetheretherketone, polyamide, polysulfone, polyethersulfone, and polyetherimide.

8. The process of claim 5, wherein the adhesive material is an epoxy.

9. The process of claim 5, wherein the adhesive material is at least one of phenolic nitrile resin, acrylic, silicone, hot-melt thermoplastic, pressure sensitive adhesive, rubber thermoset.

10. The process of claim 5, wherein the sheet stock further comprises:
    a release liner over one side of the substrate; and
    a carrier strip over the other side of the substrate.

11. The process of claim 10, wherein the cut extends entirely through the release liner, the adhesive material, and the substrate and at least partially through the carrier strip.

12. The process of claim 1, wherein the irradiation source is a laser.

13. The process of claim 12, wherein the laser is at least one of a solid state laser, an infrared laser, a free electron laser, a gas discharge laser, a visible light laser, and an ultraviolet laser.

14. The process of claim 12, wherein the laser is an ultraviolet laser including at least one of an excimer laser and the third or fourth harmonic of a solid state laser.

15. The process of claim 12, wherein the laser is an excimer laser including at least one of a KrF laser, a XeF laser, a XeCl, and an ArF laser.

16. The process of claim 12, wherein the laser is at least one of an RF $CO_2$ laser and a TEA $CO_2$ laser.

17. The process of claim 16, wherein the laser wavelength is approximately 9.3 $\mu$m.

18. The process of claim 12, wherein the pattern is made using a flying spot cutting process using the laser.

19. The process of claim 12, wherein the pattern is defined by an imaging ablation process using the laser.

20. The process of claim 12, wherein the pattern is made with a hybrid system comprising both a flying spot cutting system for cutting a portion of the part and an imaging ablation system for cutting another portion of the part.

21. The process of claim 1, wherein the part is a fluid seal.

22. The process of claim 21, wherein the fluid seal is for an ink jet print cartridge.

23. The process of claim 1, wherein the patterning is conducted in an imaging mode and the irradiation source is imaged onto the sheet stock.

24. The process of claim 1, wherein the patterning is conducted using a flying spot scanning method.

25. A system for precision patterning sheet stock, comprising:
- an irradiation source that initially irradiates a surface of a sheet stock with a beam to pattern a part in the sheet stock at a linear rate; and
- a controller that cuts at least one cut having a controlled depth in the sheet stock with the beam, wherein at least one of a beam width and a power of the irradiation source is adjusted so that a cutting rate is non-linear as the controlled depth is approached.

26. The system of claim 25, wherein the patterning is conducted in an imaging, mode and the irradiation source is imaged onto the sheet stock.

27. The system of claim 25, wherein the patterning is conducted using a flying spot scanning method.

28. The system of claim 25, wherein the beam width is about one half to one fifth of the controlled depth.

29. The system of claim 25, wherein the beam width is about one third of the controlled depth.

30. The system of claim 25, wherein the irradiation source is a laser.

31. The system of claim 30, wherein the laser is at least one of a solid state laser, an infrared laser, a free electron laser, a gas discharge laser, a visible light laser, and an ultraviolet laser.

32. The system of claim 30, wherein the laser is an ultraviolet laser including at least one of an excimer laser and the third or fourth harmonic of a solid state laser.

33. The system of claim 30, wherein the laser is an excimer laser including at least one of a KrF laser, a XeF laser, a XeCl, and an ArF laser.

34. The system of claim 30, wherein the laser is at least one of an RF $CO_2$ laser and a TEA $CO_2$ laser.

35. The system of claim 30, wherein the pattern is made using a flying spot cutting process using the laser.

36. The system of claim 30, wherein the pattern is defined by an imaging ablation process using the laser.

37. The system of claim 30, wherein the pattern is made with a hybrid system comprising both a flying spot cutting system for cutting a portion of the part and an imaging ablation system for cutting another portion of the part.

* * * * *